Dec. 22, 1942.  W. F. NEWHOUSE  2,305,932
COVER FASTENER
Filed April 15, 1940
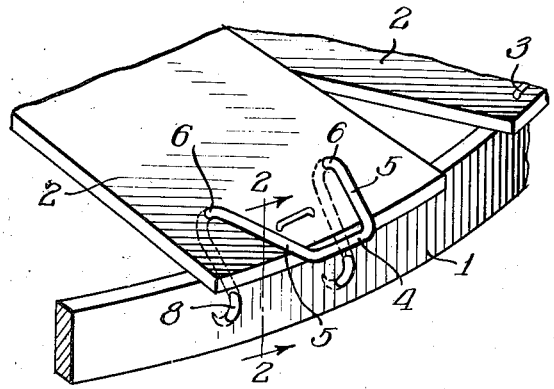
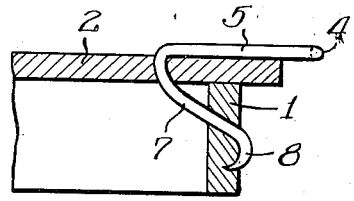
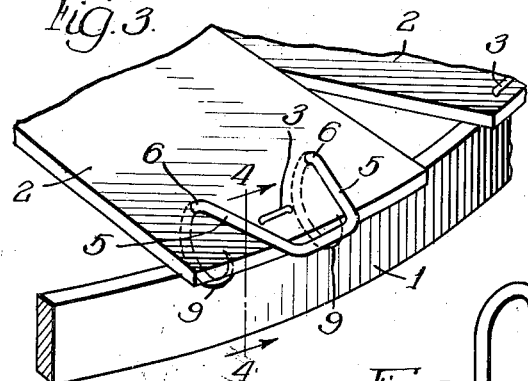
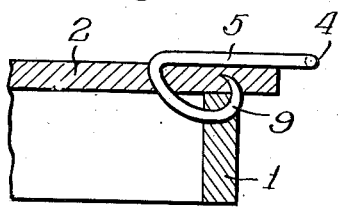
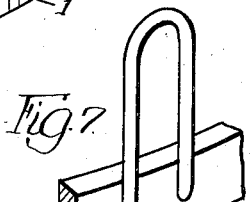
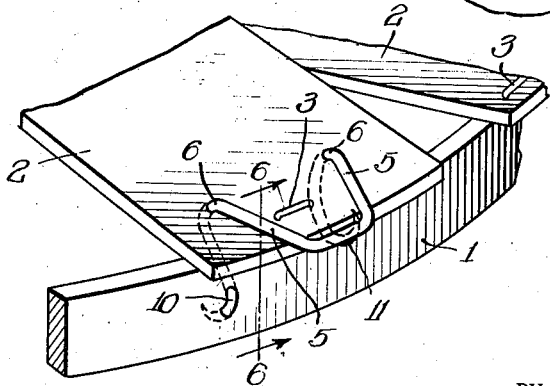
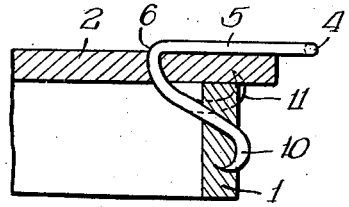
INVENTOR.
Walter F. Newhouse,
BY Spencer, Marzall, Johnston & Cook,
Attys.

Patented Dec. 22, 1942

2,305,932

UNITED STATES PATENT OFFICE 2,305,932

COVER FASTENER

Walter F. Newhouse, Benton Harbor, Mich.

Application April 15, 1940, Serial No. 329,645

3 Claims. (Cl. 217—124)

This invention relates to wire fasteners for the covers of containers, such as the covers for baskets, and more particularly to that form of cover that has a disk or mat of flat material fastened permanently to a hoop.

This application is a continuation in part of application Serial No. 129,338, filed March 6, 1937, since abandoned.

Generally stated, the object of the invention is to provide a novel and improved construction and arrangement whereby the two legs of a fastener of this kind are inserted downwardly practically vertically through the flat material and then practically horizontally and outwardly through the hoop, so that the ends of the fastener are then clinched at the outer side or periphery of the hoop, preferably by deflecting said ends back into the cover, leaving the head of the fastener in position for interlocking engagement with a flexible tongue on the side of the basket, and whereby the fastener is securely anchored in the structure of the cover, and is less liable to pull out when used for fastening the cover in place.

It is also an object to provide certain details and features of construction tending to increase the general efficiency and desirability of a wire fastener of this particular character.

To the foregoing and other useful ends, the invention consists in matters hereinafter set forth and claimed and shown in the accompanying drawing, in which—

Fig. 1 is a perspective of a portion of a basket cover provided with a fastener involving the principles of the invention.

Fig. 2 is a vertical section on line 2—2 in Fig. 1 of the drawing.

Figs. 3 and 4 are similar views, showing a different form of the invention.

Figs. 5 and 6 are similar views, showing a different form of the invention.

Fig. 7 is a perspective, of a fragmentary nature, showing a portion of the rim or upper edge of the body of the basket, and showing the wire loop which forms a tongue for insertion upwardly through the loop of the cover, and which tongue is then bent downwardly to form a hook like engagement with the loop fastener on the cover.

As thus illustrated, referring to Figs. 1 and 2, the invention comprises an annular hoop 1, to which the disk or mat of flat material 2 is secured by staples 3, so that the edge portions of the disk or mat are securely fastened to the upper edge of the hoop and preferably overhang the latter. It will be understood that each of the staves 2, of the said disk or mat, have the grain of the wood extending lengthwise thereof, so that any split in the stave will be lengthwise.

The cover fastener 4 is made of suitable wire, with the legs 5 thereof converging outwardly from the points 6 where the wire is inserted through the stave, so that the pull on the fastener is more or less crosswise of the grain of the wood. The lower end portions 7 of the fastener are inserted outwardly through the hoop 1, are clinched on the periphery or outer side of the hoop, and deflected back into the latter, as shown at 8 in the drawing. Thus, the fastener is inserted downwardly through the flat material and obliquely and outwardly through the hoop, and clinched on the outer side of the latter. This forms a strong anchorage for the fastener, which is in the form of a loop that overhangs the outer edge of the cover, in position to be interengaged with a tonguelike loop on the side of the basket, in the well known manner of cover fasteners of this general character.

In Figs. 3 and 4, the construction is substantially the same as that previously described, but in this case the extreme end portions 9 of the wire are deflected upwardly and into the flat material.

In Figs. 5 and 6, the construction is similar to that previously described, but in this case one end portion 10 is deflected downwardly and back into the hoop, while the other end portion 11 is deflected upwardly and into the flat material of the cover.

In each form of the invention, therefore, a fastener is provided which is inserted downwardly through the flat material and then obliquely and outwardly through a hoop, or through a strip of reinforcing material secured to the under side of the flat material, and the outer end or ends of the fastener are then clinched on the outer side of the hoop. The wire fastener thus made is both a cover fastener, for it holds a cover on a basket, and it is also a fastener in the sense that it serves to fasten the flat material to the upper edge of the hoop. The fastener is less liable to split the flat material, when an outward pull is exerted on the looplike fastener, because of the angular arrangement of the legs 5 thereof, as in this way the pull is more or less crosswise of the grain of the wood. By clinching the ends of the wire on the outer side of the reinforcing strip, and by deflecting the sharp ends back into the materials, a very secure anchorage is obtained for the wire fastener in the structure of the cover.

Fig. 7 shows one of the wire tongues on the basket body for insertion through the wire loops shown on the cover. Of course, flexible tongues of this kind on the body of the basket are common and well known, and practically form no part of the real invention in this case, but the novel wire loop members shown on the basket cover are not operative unless something is provided that can be inserted through them and bent in one way or another to hold the cover in place.

Obviously, regardless of whether the loop rests on the veneer 2, the legs 5 thereof converge outwardly, and in addition the points of insertion at 6 are a substantial distance inside the hoop, and from the edge or end of the grain of the veneer 2, and, also, regardless of any clamping action of said loop, of the slat on the hoop, the wire ends are advantageously inserted outwardly through the hoop and clinched outside, for that would all be true without the said clamping action, which latter may or may not be used, so far as the essential feaures of novelty are concerned.

The invention, therefore, relates to a wire device which is a permanent part of a cover having a hoop or other reinforcement which is necessarily inserted permanently in the veneer end hoop of the cover before the latter is applied to the top of a basket, and which is adapted to be used to removably hold the cover in place on the basket or other container.

Also, it will be seen that the outward taper of the wire loop on the cover, produced by outwardly converging the legs or side portions 5 of said loop, tends to prevent slackness in said loop when the latter is subjected to a pull by the tightening of the cover on the basket. If the legs 5 were exactly parallel, with the head 4 thereby as wide as the distance between points 6 and 6, there would be some lengthwise stretching of this loop, as the latter would contract at its outer end, and such lengthening of the loop would be objectionable; but with the head 4 relatively narrow, and with the legs 5 outwardly converging thereto, this tendency to lengthen and produce slackness in the fastener loop is counteracted and minimized, and may even be entirely prevented.

By clinching the ends of the wire of the cover member, in the materials of the latter, the sharp points thereof are definitely and securely imbedded in the said materials, so that the loop-shaped cover fastener is less liable to pull out when placed under the strain of holding the cover in place. In addition, the clinching is done in such a manner that the said points are imbedded a substantial distance above the lower edge of the hoop and the clinching is prevented from mutilating or weakening or obstructing the continuity of said lower edge, and this tends to insure against injury to the hands of workers. In other words, if the said lower edge of the hoop should become weakened or splintered or mutilated, or if the wire ends were partially exposed or allowed to be exposed by rough handling of the basket and its cover, the hands of workers would be in danger. Therefore, the definite imbedding of the wire points in the materials of the cover, at points safely and more or less remote above the lower edge of the cover, not only insures against any danger of the fastener pulling out, but also against injury to the hands of the workers, not only when covers of this kind are handled in the factories where they are made, but also when these baskets and their covers are handled by workers afterwards, either on the fruit growing farms, or in places where the fruit or other products are sold. Therefore, the placing of the loop-shaped wire fastener on the cover, in the manner shown and described, involves no hazard to the shipipng of the fruit or other products, or to the hands of workers anywhere along the line.

And, in this connection, in addition to locating the clinched ends of the wire a substantial distance above the lower edge of the hoop, as is true of each form of the invention, it will also be seen that the said ends are sharp and tapered, and that hence there is less danger of splitting the bent wood strip forming the hoop.

Therefore, in each form of the invention, there must be a primary deflection of the wire immediately under the mat 2, to direct the wire substantially or practically horizontally toward the hoop, so that the points of the wire will pass through the hoop a safe distance above the smooth lower edge of the latter, preferably nearer the upper edge of the hoop than its said lower edge, and there is then a secondary deflection of the wire on the outer side of the hoop, thereby to turn the points or ends of the wire definitely back into the cover, whereby the wire is driven practically vertically and downwardly through the mat 2, but is then driven practically horizontally and outwardly through the hoop.

What I claim as my invention is:

1. A basket cover fastener made of wire and having legs driven downwardly through the mat and then outwardly through the hoop, each leg having a definite deflection between the bottom of the mat and the inner side of the hoop, so that the wire extends practically downward vertically to a more or less extent in the mat, but practically horizontally to a more or less extent through the hoop, thereby to facilitate driving and to locate the points of insertion in the hoop nearer the upper edge of the latter than its lower edge, the ends of the wire being clinched back into the cover at the outer side of the hoop at points substantially and safely above the smooth lower edge of the hoop, and the fastener thus driven in a deviating direction having a top portion for engagement with a flexible fastener on the side of the basket, the wire in driving thus requiring upward deflection and change of direction under the mat, from its line of travel through the latter, before reaching the hoop, and requiring a second deflection at the outer side of the loop, preventing each leg from extending vertically at the inner side of the hoop, while also preventing each leg from extending on a straight line through the mat and hoop.

2. A cover fastener of the character described for covers having a mat portion and a hoop portion comprising a wire member having leg portions extending substantially vertically through said mat portion interiorly of said hoop portion, said leg portions being bent upwardly beneath said mat portion to enter and extend through said hoop portion at a substantially different angle with respect to the vertical and in a generally horizontal direction, and the ends of said legs extending outwardly from said hoop portion being clinched back into said covering to thereby securely lock the fastener to said mat and hoop portions by a double deflection of said leg portions of the wire member.

3. A cover fastener of the character described for basket covers having a mat portion and a hoop portion comprising a wire member having leg portions extending substantially vertically through said mat portion interiorly of said hoop portion, said leg portions being bent upwardly beneath said mat portion to enter and extend through said hoop portion at a substantially different angle with respect to the vertical and in a generally horizontal direction, the ends of said legs extending outwardly from said hoop portion and being clinched back into said covering to thereby securely lock the fastener to said mat and hoop portions by a double deflection of said leg portions of the wire member, and said wire member above said mat portion being bent to lie substantially in the plane of the mat and to extend outwardly beyond the mat to provide for securing said mat and hoop to a basket.

WALTER F. NEWHOUSE.